Patented Sept. 30, 1947

2,428,253

UNITED STATES PATENT OFFICE 2,428,253

WATER-SOLUBLE DERIVATIVES OF 2-METHYL - 1,4-DIHYDROXY-NAPHTHALENE AND PROCESSES FOR THEIR PRODUCTION

Fritz von Werder, Darmstadt, Germany; vested in the Attorney General of the United States No Drawing. Application February 6, 1941, Serial No. 377,673. In Germany March 23, 1940

4 Claims. (Cl. 260—294)

This invention relates to water-soluble derivatives of 2-methyl-1,4-dihydroxy-naphthalene and processes for their production.

Compounds which are derived from 2-methyl-1,4-naphthoquinone have lately met with particular interest because this quinone displays approximately the same, possibly an even greater antihemorrhagic activity as the natural coagulation vitamin $K_1$. For the therapy of vitamin K deficiency diseases in which resorption disturbances play a decisive role, active agents for parenteral and, in particular, intravenous administration are preferred. Water-soluble derivatives of 2-methyl-1,4-naphthoquinone with vitamin K action, therefore, merit special interest. A number of water-soluble compounds of this series have already been proposed for use in the vitamin K therapy. Almquist and Klose [Journal of the American Chemical Society, volume 61, page 1923 (1939)] considered the coloring matter of the fat of human tubercle bacilli, i. e., phthiocol (2-methyl-3-hydroxy-1,4-naphthoquinone) suitable, but Fernholz and Ansbacher [Science 90, 2331, p. 215 (1939)] were able to prove that as a coagulation vitamin, phthiocol is only weakly active. Doisy and co-workers [compare, for example, Journal of the American Chemical Society, vol. 61, p. 2563 (1939)] have suggested 1,4-dihydroxy-2-methyl-naphthalene and 1,4-dihydroxy-2-methyl-4-aminonaphthalene for the purpose in question. However, Fieser and Fry [Journal of the American Chemical Society, vol. 62, pp. 228–229 (1940)] rightfully pointed out that 2-methyl-1,4-naphthohydroquinone and aminonaphthol derivatives are extremely susceptible to oxidation. They are, therefore, not sufficiently stable for the practical application as medicinal remedies. Moreover, as my own experiments have shown, these compounds are usually not well tolerated. Fieser and Fry (loc. cit.) have decided upon an interesting procedure, by preparing the water-soluble alkali salts of sulfuric and phosphoric acid esters of 1,4-dihydroxy-2-methyl-naphthalene. But even these preparations still show a number of imperfections. The sodium-2-methyl-1,4-naphthohydroquinone-disulfate is not very water-soluble, as it can be recrystallized from water. For the clinical experiment described in the publication by Fieser and Fry, the salt was used only in a 0.1% solution. The yields, too, are unsatisfactory; according to the statements by Fieser and Fry, only about 42% of theory, calculated on the 1,4-dihydroxy-2-methyl-naphthalene used, of still impure dihydrate of the ester salt is obtained. The sodium salt of the phosphoric acid ester, on the biologic activity of which Foster, Lee and Solmssen, Journal of the American Chemical Society, vol. 62, p. 453 (1940), also reported briefly, is extremely hygroscopic and deliquesces in the air.

The present invention opens up a new class of water-soluble derivatives of 1,4-dihydroxy-2-methyl-naphthalene with vitamin K action. The new compounds are crystalline substances, easily soluble in water, stable, and not sensitive to light and air. In addition to being very water-soluble, they possess the advantage of being non-hydroscopic, and of making possible control of their degree of purity through the melting point.

According to my invention, easily water-soluble derivatives of 2-methyl-1,4-dihydroxy-naphthalene are prepared by esterifying 1,4-dihydroxy-2-methyl-naphthalene with such organic acids as contain a nitrogen atom capable of salt formation. The nitrogen atom can be present in an aliphatic or in a cyclic linkage. Esterification is preferably effected by warming 1,4-dihydroxy-2-methyl-naphthalene with the corresponding amino acid chlorides or their hydrochlorides, respectively, with or without agents for binding hydrogen chloride.

Another method is that of first preparing the halogen fatty acid esters of 1,4-dihydroxy-2-methyl-naphthalene, hitherto not described in the literature, and then reacting these with amines.

In the treatment with an excess of amine, partial saponification may occur; mono esters are obtained, and their salts are likewise easily soluble in water. The basic esters are converted into water-soluble salts in the usual manner, for example, by treatment in an ether solution with ethereal hydrochloric acid.

The above described procedure can, of course, also readily be carried out with the derivatives of 1,4-dihydroxy-naphthalene, substituted in the 2- and/or in the 3-position by saturated or unsaturated hydrocarbon residues which, per se or in the form of quinones, show antihemorrhagic activity.

The following examples are presented by way of illustration and not of limitation, for obviously, certain modifications in the steps of the process and the quantities of the materials employed may be made without departing from the spirit and scope of the disclosures herein.

Examples (1) 180 g. of N-methyl-nipecotic acid (N-methyl hexahydronicotinic acid) is heated with 800 cc. of thionyl chloride and refluxed for two hours. The excess thionyl chloride is distilled off in vacuo, the residue is triturated with petroleum ether, suction-filtered, washed with petroleum ether and dried. The crude N-methyl-nipecotic acid chloride hydrochloride with a melting point of 159° is sufficiently pure for further working up procedure. The yield is 93.5% of theory.

8.5 g. of 1,4-dihydroxy-2-methyl-naphthalene and 24 g. of N-methyl-nipecotic acid chloride hydrochloride are triturated thoroughly and heated slowly in a nitrogen atmosphere. The temperature is maintained at 110–140° for three hours. After cooling, the reaction mixture is dissolved in 85 cc. of 5% hydrochloric acid. The ester base is precipitated by the addition of excess 10% sodium hydroxide solution. After prolonged standing, the initially oily precipitate becomes solid; it is filtered, washed with water, and dried. The yield is 21 g. equal to 86.4% of theory. The material is dissolved in absolute ether and treated with ethereal hydrochloric acid. The hydrochloride is filtered, washed with ether and recrystallized from alcohol in the presence of charcoal. The hydrochloride of 1,4-dihydroxy-2-methyl-naphthalene-bis (N-methyl-nipecotic acid) ester forms colorless crystals which melt at 285° and whose analytical values correspond to the empirical formula $C_{25}H_{34}O_4N_2Cl_2$. The salt is readily soluble in water. The aqueous solution is stable to light and air and can be sterilized.

The isethionic acid salt and the lactic acid salt of the above-mentioned base are particularly water-soluble.

(2) 17 g. of 1,4-dihydroxy-2-methyl-naphthalene are triturated with 40 g. of chloracetic acid anhydride and heated for 4 hours at 110° in a nitrogen atmosphere. After cooling, the solidified melt is dissolved in warm ether. The solution is stirred for two hours with an equal volume of water. The precipitated chloracetate is filtered and washed with ether. The ether solution is separated from the filtrate, washed with 0.5 N sodium bicarbonate solution and with water, dried, filtered, concentrated, and finally dried in vacuo. The residue, together with the previously separated portions, is recrystallized from 90% alcohol. The 1,4-dihydroxy-2-methyl-naphthalene-dichloracetate forms colorless leaflets with a melting point of 111°. The yield is 27.2 g., corresponding to 85% of theory.

20 g. of 1,4-dihydroxy-2-methyl-naphthalene-dichloracetate are refluxed with 200 cc. of diethylamine in a hydrogen atmosphere for 3 hours on a bath at 70°. The diethylamine hydrochloride crystallized out is filtered, washed with ether, and dried. The yield is 97% of theory. The filtrate is evaporated in vacuo to dryness, and the residue triturated with normal benzine. The undissolved portion is freed in vacuo from residual benzine and dissolved in 400 cc. of 5% hydrochloric acid. The ester base is precipitated by an addition of 10% sodium hydroxide solution. The oily material is taken up in ether, the ether solution washed with water, dried over ignited potassium carbonate, concentrated, and treated with ethereal hydrochloric acid. The hydrochloride of 1,4-dihydroxy-2-methyl-naphthalene-1-diethylamino acetic ester is filtered and recrystallized from alcohol in the presence of charcoal. The easily water-soluble crystals melt at 248°.

(3) 53 cc. of anhydrous pyridine are heated with passage of hydrogen, and recooled. In this solvent is dissolved 5.3 g. of 1,4-dihydroxy-2-methyl-naphthalene, to which is then added 9.3 g. of nicotinic acid chloride. The reaction mixture, which has become warm, is allowed to stand in a closed vessel. After 20 hours the pyridine is distilled off in high vacuo and the residue dissolved in 53 cc. of 5% hydrochloric acid.

The ester base precipitated by an addition of 10% sodium hydroxide solution is filtered, washed with water and recrystallized from acetone in the presence of charcoal. The 1,4 - dihydroxy - 2 - methyl-naphthalene-bis (nicotinic acid) ester crystallizes from acetone in coarse granules which melt at 168–169°. The yield is 10 g., equal to 85.5% of theory. For the preparation of the hydrochloric acid salt, the ester base is dissolved in absolute alcohol and treated with alcoholic hydrochloric acid. The hydrochloride melts at 258–260°.

(4) 5.8 g. of 1,4 - dihydroxy - 2,3 - dimethyl-naphthalene and 15 g. of N-methyl-nipecotic acid chloride-hydrochloride are triturated thoroughly and heated for 4 hours at 140° in a nitrogen atmosphere. After cooling, the material is digested with 58 cc. of 5% hydrochloric acid and filtered from undissolved portions. The undissolved material is washed with 50 cc. of 5% hydrochloric acid and 150 cc. of water. Filtrate and washings are combined and made distinctly alkaline by the addition of 40% soda solution. The base precipitated in granules is suction-filtered and taken up in ether, the ethereal solution washed with water, dried over potash, filtered, and concentrated to a volume of 200 cc. By the addition of ethereal hydrochloric acid the hydrochloride is precipitated, which, after standing for a short time, is suction-filtered, washed with ether, and dried. Yield 8.9 g. The salt is dissolved in water, the base liberated by the addition of soda solution, and recrystallized from a small amount of acetone or cyclohexane. The 1,4-dihydroxy-2,3-dimethyl-naphthalene-bis - N - methyl - nipecotic acid ester crystallizes from acetone and cyclohexane, respectively, in coarse aggregates, melting at 151° and yielding analytical values corresponding to the formula $C_{26}H_{34}O_4N_2$. The hydrochloride of the ester is a colourless powder and melts at 301 to 302°.

(5) 33 g. of 1,4-dihydroxy-2-methyl-naphthalene are dissolved in 132 cc. of dry pyridine and treated with 160 g. of N-piperidinoacetylchloride-hydrochloride with constant stirring (cf. DRP. 629,054), the mixture warming to 75–80° with initial clarification. By heat supply the whole is maintained for another hour at 80° with stirring, then cautiously treated with 800 cc. of 5% hydrochloric acid, by cooling with ice water. After the addition of 1 l. of water, 1750 cc. of 40% soda solution are added and the base precipitated as an oil is taken up in ether. The ethereal solution washed with water is dried over potash, filtered, concentrated to a volume of 2.5 l. and treated with 300 cc. of ethereal hydrochloric acid. The precipitated hydrochloride is suction-filtered at once, washed with absolute ether, and treated with 250 cc. of alcohol in the warm. After standing for 6 hours, there are added a further 250 cc. of cold alcohol; the purified salt is suction-filtered, washed with alcohol and ether, and dried. Yield 58 g., melting point 262°. The 1,4-dihydroxy-2-methyl-naphthalene - bis - N - piperidine acetate prepared from this material forms colourless crystals from ether, melts at 105–106° and yields analytical values corresponding to the formula, $C_{25}H_{32}O_4N_2$. The absorption spectrum in the ultra violet shows a maximum at the wave-length of 283 m$\mu$, the extinction coefficient $$E_{1\ cm.}^{1\%}$$

being 195 at this wave-length. The hydrochloride prepared from the crystallized base melts at 264°.

(6) 47 g. of 1,4-dihydroxy-2-methyl-naphthalene are dissolved in 188 cc. of pyridine and treated with 191 g. of $\alpha$-diethyl-$\beta$-dimethylamino-propionic acid chloride-hydrochloride (cf. DRP. 629,054), the temperature rising up to about 70°. The mixture is stirred for an hour at 80°, taken up in hydrochloric acid after cooling, and, for precipitation of the base, treated with soda solution, and extracted with ether. The crude hydrochloride precipitated from the washed, dried and concentrated ethereal solution is treated with acetone and again converted into the base, which is now recrystallized from petrol ether in magnificent, colourless crystals. The 1,4-dihydroxy-2-methyl-naphthalene-bis-$\alpha$-diethyl-$\beta$-dimethylamino-propionate melts at 79° and yields analytical values corresponding to the formula $C_{29}H_{44}O_4N_2$. The hydrochloride melts at 230°, its aqueous solution has an absorption spectrum which is characterized by a maximum at $$283\ m\mu \left(E_{1\ cm.}^{1\%}=172\right)$$

and a minimum at $$247\ m\mu \left(E_{1\ cm.}^{1\%}=28\right)$$

I claim:

1. A compound selected from the group consisting of 1,4 dihydroxy-2-methyl-naphthalene-bis(N-methyl-nipecotic acid) ester having the formula

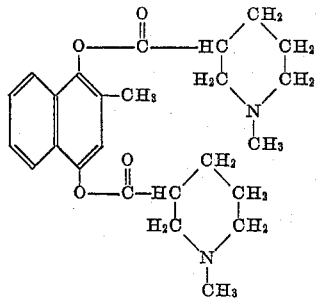

1,4 dihydroxy-2-methyl-naphthalene-bis-(nicotinic acid) ester having the formula

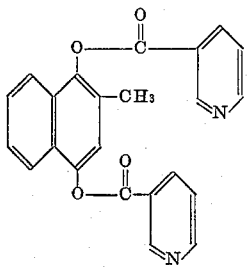

and 1,4 dihydroxy-2-methyl-naphthalene-bis-piperidine acetate having the formula

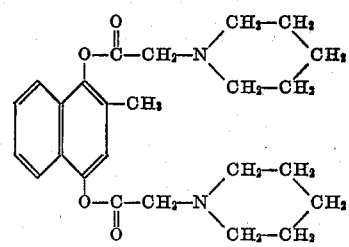

2. 1,4-dihydroxy-2-methyl-naphthalene-bis (N-methyl-nipecotic acid) ester having the formula

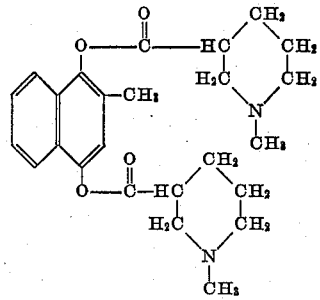

3. 1,4-dihydroxy-2-methyl-naphthalene-bis (nicotinic acid) ester having the formula

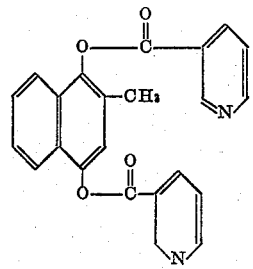

4. 1,4-dihydroxy-2-methyl-naphthalene-bis-N-piperidino acetate having the formula

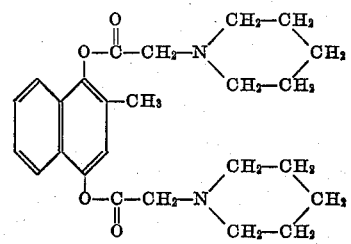

FRITZ VON WERDER.

REFERENCES CITED

The following references are of record in the file of this patent:

UNITED STATES PATENTS

| Number | Name | Date |
|---|---|---|
| 1,984,511 | Anderson et al. | Dec. 18, 1934 |
| 2,138,809 | Reiff | Nov. 29, 1938 |
| 2,372,655 | Bochmuhl | Apr. 3, 1945 |

OTHER REFERENCES

J. American Chemical Soc., vol. 61 (1939), p. 2561.

J. American Chemical Soc., vol. 62 (Jan. 1940), pp. 228–9.

J. American Chemical Soc., vol. 62 (Jan. 1940), pp. 153–158.